(12) United States Patent
Sun et al.

(10) Patent No.: US 10,579,862 B2
(45) Date of Patent: Mar. 3, 2020

(54) METHOD, DEVICE, AND COMPUTER READABLE STORAGE MEDIUM FOR DETECTING FEATURE POINTS IN AN IMAGE

(71) Applicant: BOE Technology Group Co., Ltd., Beijing (CN)

(72) Inventors: Mengmeng Sun, Beijing (CN); Zhenglong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 15/751,325

(22) PCT Filed: Jul. 17, 2017

(86) PCT No.: PCT/CN2017/093151
§ 371 (c)(1),
(2) Date: Feb. 8, 2018

(87) PCT Pub. No.: WO2018/126638
PCT Pub. Date: Jul. 12, 2018

(65) Prior Publication Data
US 2019/0266387 A1    Aug. 29, 2019

(30) Foreign Application Priority Data
Jan. 3, 2017    (CN) .......................... 2017 1 0003459

(51) Int. Cl.
*G06K 9/00*       (2006.01)
*G06K 9/46*       (2006.01)
(Continued)

(52) U.S. Cl.
CPC .......... *G06K 9/00281* (2013.01); *G06K 9/00* (2013.01); *G06K 9/46* (2013.01); *G06K 9/62* (2013.01);
(Continued)

(58) Field of Classification Search
CPC ........ G06K 9/00281; G06K 9/00; G06K 9/46; G06K 9/62; G06K 9/6256; G06N 3/02; G06N 3/04; G06N 3/08
See application file for complete search history.

(56) References Cited

U.S. PATENT DOCUMENTS 9,400,922 B2    7/2016   Zhou et al.
2003/0174881 A1  9/2003   Simard et al.
(Continued)

FOREIGN PATENT DOCUMENTS

CN    1445715 A      10/2003
CN    103824054 A    5/2014
(Continued)

OTHER PUBLICATIONS

Xingyu Zeng et al "Gated Bi-directional CNN for Object Detection" ECCV Sep. 2016. (Year: 2016).*
English translation of International Search Report, including Box V. of Written Opinion, for International Application No. PCT/CN2017/093151, dated Sep. 29, 2017, 4 pages.
(Continued)

*Primary Examiner* — Leon Flores
(74) *Attorney, Agent, or Firm* — Westman, Champlin & Koehler, P.A.

(57) ABSTRACT

According to the embodiments of the present disclosure, there is provided a method for detecting feature points in an image. The method comprises: processing data of the image using a first type of convolutional layers in a Convolutional Neural Network (CNN) to generate first processed data, wherein the first type of convolutional layers comprise convolution kernels having non-shared weights; processing the first processed data using a second type of convolutional layers in the CNN to generate second processed data, wherein the second type of convolutional layers comprise convolution kernels having shared weights; and determining
(Continued)

the feature points in the image based on the second processed data. In addition, the embodiments of the present disclosure further provide a corresponding device and a corresponding computer readable storage medium.

19 Claims, 3 Drawing Sheets

(51) Int. Cl.
  *G06K 9/62* (2006.01)
  *G06N 3/04* (2006.01)
  *G06N 3/08* (2006.01)
  *G06N 3/02* (2006.01)
(52) U.S. Cl.
  CPC ............. *G06K 9/6256* (2013.01); *G06N 3/02* (2013.01); *G06N 3/04* (2013.01); *G06N 3/08* (2013.01)

(56) References Cited

U.S. PATENT DOCUMENTS

| | | | |
|---|---|---|---|
| 2006/0110040 A1 | 5/2006 | Simard et al. | |
| 2015/0347819 A1* | 12/2015 | Yin | G06K 9/00221 |
| | | | 382/118 |
| 2015/0347822 A1 | 12/2015 | Zhou et al. | |
| 2016/0342888 A1 | 11/2016 | Yang et al. | |
| 2016/0350649 A1* | 12/2016 | Zhang | G06N 3/0454 |
| 2017/0011279 A1* | 1/2017 | Soldevila | G06F 16/5846 |

FOREIGN PATENT DOCUMENTS

| | | |
|---|---|---|
| CN | 104809443 A | 7/2015 |
| CN | 105956572 A | 9/2016 |
| CN | 105981041 A | 9/2016 |

OTHER PUBLICATIONS

First Chinese Office Action, including Search Report, for Chinese Patent Application No. 201710003459.0, dated Apr. 25, 2019, 13 pages.

\* cited by examiner

METHOD, DEVICE, AND COMPUTER READABLE STORAGE MEDIUM FOR DETECTING FEATURE POINTS IN AN IMAGE

CROSS-REFERENCE TO RELATED APPLICATION

This application is a Section 371 National Stage Application of International Application No. PCT/CN2017/093151, filed Jul. 17, 2017, which is not yet published, and claims priority to the Chinese Patent Application No. 201710003459.0, filed on Jan. 3, 2017, which are incorporated herein by reference in their entirety.

TECHNICAL FIELD

The present disclosure relates to the field of image processing, and more particularly, to a method, device, and computer readable storage medium for detecting feature points in an image.

BACKGROUND

Face analysis, which is an important part in the field of image processing, plays a very important role in various fields. For example, face analysis has important applications in terms of face recognition and emotion detection. There are currently many methods for face analysis, such as shape constraints, regression trees, texture information, and a combination thereof. In addition, there are also some shallow machine learning methods.

SUMMARY

However, there are some problems with these methods more or less. For example, a gradient boosting tree method is computationally fast, but it is susceptible to interference in s complex environment. In addition, a human face has strong structured information, that is, outlines, colors, sizes, and relative positions etc. of various features (such as eyes, a nose, ears, a mouth, etc.) of the human face are generally fixed. Therefore, how to effectively use the information to improve the accuracy and speed of detection of feature points of the human face has become an important issue.

In order to at least partially solve the above problems, a method, device, and computer-readable storage medium for detecting feature points in an image according to an embodiment of the present disclosure are provided.

According to a first aspect of the present disclosure, there is provided a method for detecting feature points in an image. The method comprises: processing data of the image using a first type of convolutional layers in a Convolutional Neural Network (CNN) to generate first processed data, wherein the first type of convolutional layers comprise convolution kernels having non-shared weights; processing the first processed data using a second type of convolutional layers in the CNN to generate second processed data, wherein the second type of convolutional layers comprise convolution kernels having shared weights; and determining the feature points in the image based on the second processed data.

In some embodiments, a size of convolution kernels of a preceding one of the first type of convolutional layers is greater than or equal to that of convolution kernels of a subsequent one of the first type of convolutional layers in the CNN, and a number of the convolution kernels of the preceding one of the first type of convolutional layers is less than or equal to that of the convolution kernels of the subsequent one of the first type of convolutional layers in the CNN. In some embodiments, a number of the first type of convolutional layers is from 3 to 5. In some embodiments, a number of the second type of convolutional layers is from 3 to 7. In some embodiments, the first type of convolutional layers precede the second type of convolutional layers in the CNN. In some embodiments, the first type of convolutional layers of the CNN comprise 4 convolutional layers, which comprise 20 4×4 convolution kernels, 40 3×3 convolution kernels, 60 3×3 convolution kernels and 80 2×2 convolution kernels respectively. In some embodiments, the second type of convolutional layers of the CNN comprise 5 convolutional layers, which comprise 80 3×3 convolution kernels, 80 3×3 convolution kernels, 80 3×3 convolution kernels, 80 2×2 convolution kernels, and 80 2×2 convolution kernels respectively. In some embodiments, the step of determining the feature points in the image based on the second processed data further comprises: processing the second processed data using a third type of convolutional layers in the CNN to generate third processed data, wherein the third type of convolutional layers are fully connected convolutional layers; and determining the feature points in the image based on the third processed data. In some embodiments, the CNN further comprises an activation layer which is immediately after each of the first type of convolutional layers and/or each of the second type of convolutional layers, wherein the activation layer uses one of the following activation functions: a Sigmoid function, a hyperbolic tangent function, and/or a Rectified Linear Unit (ReLU) function. In some embodiments, the CNN further comprises a pooling layer which is immediately after each of the first type of convolutional layers and/or each of the second type of convolutional layers, wherein the pooling layer uses one of the following pooling functions: a maximum pooling function and/or an average pooling function. In some embodiments, the CNN is trained using a Stochastic Gradient Descent (SGD) method. In some embodiments, an initial learning rate is $10^{-2}$. In some embodiments, initial weights of each of the convolutional layers in the CNN are initialized using Gaussian random numbers with a mean of 0 and a variance of 0.01.

According to a second aspect of the present disclosure, there is provided a device for detecting feature points in an image. The device comprises: a first convolution processing unit configured to process data of the image using a first type of convolutional layers in a Convolutional Neural Network (CNN) to generate first processed data, wherein the first type of convolutional layers comprise convolution kernels having non-shared weights; a second convolution processing unit configured to process the first processed data using a second type of convolutional layers in the CNN to generate second processed data, wherein the second type of convolutional layers comprise convolution kernels having shared weights; and a feature point determination unit configured to determine the feature points in the image based on the second processed data.

In some embodiments, a size of convolution kernels of a preceding one of the first type of convolutional layers is greater than or equal to that of convolution kernels of a subsequent one of the first type of convolutional layers in the CNN, and a number of the convolution kernels of the preceding one of the first type of convolutional layers is less than or equal to that of the convolution kernels of the subsequent one of the first type of convolutional layers in the CNN. In some embodiments, a number of the first type of convolutional layers is from 3 to 5. In some embodiments, a number of the second type of convolutional layers is from 3 to 7. In some embodiments, the first type of convolutional layers precede the second type of convolutional layers in the CNN. In some embodiments, the first type of convolutional layers of the CNN comprise 4 convolutional layers, which comprise 20 4×4 convolution kernels, 40 3×3 convolution kernels, 60 3×3 convolution kernels and 80 2×2 convolution kernels respectively. In some embodiments, the second type of convolutional layers of the CNN comprise 5 convolutional layers, which comprise 80 3×3 convolution kernels, 80 3×3 convolution kernels, 80 3×3 convolution kernels, 80 2×2 convolution kernels, and 80 2×2 convolution kernels respectively. In some embodiments, the feature point determination unit is further configured to: process the second processed data using a third type of convolutional layers in the CNN to generate third processed data, wherein the third type of convolutional layers are fully connected convolutional layers; and determine the feature points in the image based on the third processed data. In some embodiments, the CNN further comprises an activation layer which is immediately after each of the first type of convolutional layers and/or each of the second type of convolutional layers, wherein the activation layer uses one of the following activation functions: a Sigmoid function, a hyperbolic tangent function, and/or a Rectified Linear Unit (ReLU) function. In some embodiments, the CNN further comprises a pooling layer which is immediately after each of the first type of convolutional layers and/or each of the second type of convolutional layers, wherein the pooling layer uses one of the following pooling functions: a maximum pooling function and/or an average pooling function. In some embodiments, the CNN is trained using a Stochastic Gradient Descent (SGD) method. In some embodiments, an initial learning rate is $10^{-2}$. In some embodiments, initial weights of each of the convolutional layers in the CNN are initialized using Gaussian random numbers with a mean of 0 and a variance of 0.01.

According to a third aspect of the present disclosure, there is provided a computer readable storage medium having instructions stored thereon. The instructions, when executed by a computer, cause the computer to perform the method according to various embodiments described above.

In some embodiments, a size of convolution kernels of a preceding one of the first type of convolutional layers is greater than or equal to that of convolution kernels of a subsequent one of the first type of convolutional layers in the CNN, and a number of the convolution kernels of the preceding one of the first type of convolutional layers is less than or equal to that of the convolution kernels of the subsequent one of the first type of convolutional layers in the CNN. In some embodiments, a number of the first type of convolutional layers is from 3 to 5. In some embodiments, a number of the second type of convolutional layers is from 3 to 7. In some embodiments, the first type of convolutional layers precede the second type of convolutional layers in the CNN. In some embodiments, the first type of convolutional layers of the CNN comprise 4 convolutional layers, which comprise 20 4×4 convolution kernels, 40 3×3 convolution kernels, 60 3×3 convolution kernels and 80 2×2 convolution kernels respectively. In some embodiments, the second type of convolutional layers of the CNN comprise 5 convolutional layers, which comprise 80 3×3 convolution kernels, 80 3×3 convolution kernels, 80 3×3 convolution kernels, 80 2×2 convolution kernels, and 80 2×2 convolution kernels respectively. In some embodiments, the instructions when executed by the computer, cause the computer to: process the second processed data using a third type of convolutional layers in the CNN to generate third processed data, wherein the third type of convolutional layers are fully connected convolutional layers; and determine the feature points in the image based on the third processed data. In some embodiments, the CNN further comprises an activation layer which is immediately after each of the first type of convolutional layers and/or each of the second type of convolutional layers, wherein the activation layer uses one of the following activation functions: a Sigmoid function, a hyperbolic tangent function, and/or a Rectified Linear Unit (ReLU) function. In some embodiments, the CNN further comprises a pooling layer which is immediately after each of the first type of convolutional layers and/or each of the second type of convolutional layers, wherein the pooling layer uses one of the following pooling functions: a maximum pooling function and/or an average pooling function. In some embodiments, the CNN is trained using a Stochastic Gradient Descent (SGD) method. In some embodiments, an initial learning rate is $10^{-2}$. In some embodiments, initial weights of each of the convolutional layers in the CNN are initialized using Gaussian random numbers with a mean of 0 and a variance of 0.01.

According to a fourth aspect of the present disclosure, there is provided a device for detecting feature points in an image. The device comprises: a processor; and a memory having instructions stored thereon, wherein the instructions when executed by the processor, cause the processor to process data of the image using a first type of convolutional layers in a Convolutional Neural Network (CNN) to generate first processed data, wherein the first type of convolutional layers comprise convolution kernels having non-shared weights; process the first processed data using a second type of convolutional layers in the CNN to generate second processed data, wherein the second type of convolutional layers comprise convolution kernels having shared weights; and determine the feature points in the image based on the second processed data.

By using the method, device and computer-readable storage medium according to the embodiments of the present disclosure, convolution kernels which do not share weights may be combined with convolution kernels which share weights, so as to make full use of the structured information of the human face to realize rapid and accurate detection of facial features.

BRIEF DESCRIPTION OF THE DRAWINGS

The above and other purposes, features and advantages of the present disclosure will become more apparent from the following description of the preferred embodiments of the present disclosure, taken in conjunction with the accompanying drawings, in which.

DETAILED DESCRIPTION

Preferred embodiments of the present disclosure will be described in detail below with reference to the accompanying drawings, in which details and functions which are not necessary for the present disclosure are omitted in the description in order to prevent confusion in the understanding of the present disclosure. In the present specification, the following description of various embodiments for describing the principles of the present disclosure is illustrative only and should not be construed as limiting the scope of the disclosure in any way. The following description of the drawings, with reference to the accompanying drawings, is provided to assist in a comprehensive understanding of the exemplary embodiments of the disclosure as defined by the claims and their equivalents. The following description includes many specific details to assist in the understanding, but such details are to be regarded as merely exemplary. Accordingly, those of ordinary skill in the art will recognize that numerous changes and modifications can be made to the embodiments described herein without departing from the scope and spirit of the present disclosure. In addition, descriptions of well-known functions and structures are omitted for clarity and conciseness. In addition, the same reference numerals are used for the same or similar functions and operations throughout the accompanying drawings.

Hereinafter, the present disclosure is described in detail, by taking a scene in which the present disclosure is applied to a wireless mobile communication system as an example. However, the present disclosure is not limited thereto, and the present disclosure may also be applied to a fixed communication system, a wired communication system, or any hybrid structure of a wireless mobile communication system, a fixed communication system, a wired communication system etc. With respect to the mobile communication system, the present disclosure is not limited to a specific communication protocol of each related mobile communication device, and may include, but is not limited to, 2G, 3G, 4G and 5G networks, WCDMA, CDMA2000, and TD-SCDMA systems etc., WiFi, Bluetooth, WiMax etc. Different mobile devices may use the same communication protocol, or may also use different communication protocols. Further, the present disclosure is not limited to a specific operating system of the mobile device, and may include, but is not limited to, iOS, Windows Phone, Symbian, Android, Windows, Linux etc. Different mobile devices may use the same operating system, or may also use different operating systems.

In the present disclosure, the terms "comprising" and "including" and their derivatives are intended to be inclusive instead of being limiting, and the term "or" may be inclusive, which means "and/or".

With the widespread use of mobile terminals (for example, smart phones, tablets, etc.), the mobile terminals have become an integral part of people's lives. The mobile terminals may provide a wide variety of application functions, among which processing of a still image/moving video is a very important application function. For example, in current image processing, targeted processing may be performed by recognizing human faces and their respective facial organs which exist in an image/video. For example, face-lift, whitening, eye enlargement etc. for an image may be collectively referred to as "facial beautification" operations. As another example, there may also be image retouching functions in which a user may be interested, for example, a function of replacing human ears in an image with a cat's ears etc.

In these applications, the mobile terminals are required to recognize various specific features in human faces. As described above, there are some problems with conventional methods more or less. For example, the gradient boosting tree method is computationally fast, but it is susceptible to interference in a complex environment. In addition, the conventional methods do not make use of strong structured information in human faces. In order to at least partially solve the above problems, there are provided a method, device, and computer-readable storage medium for detecting feature points in an image according to an embodiment of the present disclosure.

Convolutional Neural Network

Studies by Hubel and Wiesel et al. in 1950 and 1960 show that visual cortexes of cats and monkeys contain neurons which individually respond to small regions in the field of view. A region in a visual space where a single neuron is affected by visual stimuli is referred to as a receptive field or reception field of the neuron if eyes are not moving. Adjacent neurons have similar and overlapped receptive fields. Sizes and positions of the receptive fields vary systematically on cortexes to form a complete visual spatial map.

Under the inspiration by these studies, in the field of machine learning, a Convolutional Neural Network (CNN or ConvNet for short) is proposed, which is a kind of feedforward artificial neural network. Specifically, a connection mode between neurons of the neural network is inspired by animals' visual cortexes. A single neuron responds to stimuli in a limited spatial region, which is the receptive field described above. Respective receptive fields of different neurons are partially overlapped with each other, so that they are arranged to form the entire field of view. A response of a single neuron to stimuli in its receptive field may be approximated mathematically by a convolution operation. Therefore, the convolutional neural network has a wide range of applications in the fields of image and video recognition, recommendation (for example, commodity recommendation on shopping websites, etc.), and natural language processing.

Figure 1:
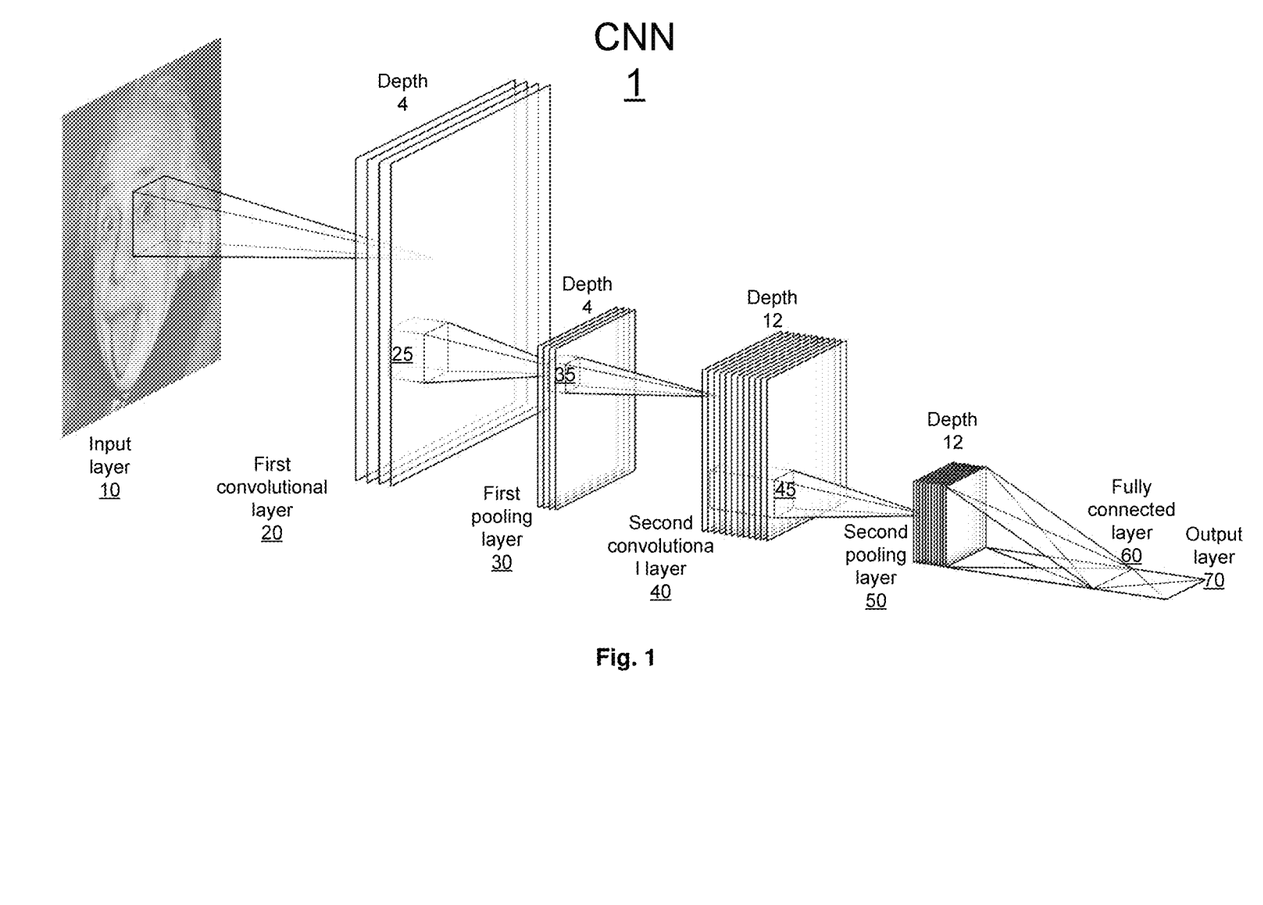
FIG. 1 is a diagram illustrating a convolutional neural network according to an embodiment of the present disclosure.

A CNN 1 according to an embodiment of the present disclosure will be described in detail below with reference to FIG. 1. FIG. 1 is a diagram illustrating the convolutional neural network CNN 1 according to the embodiment of the present disclosure. As shown in FIG. 1, the CNN 1 may generally comprise a plurality of convolutional layers 20 and 40, which are typically collections of small neurons (which are also referred to mathematically as convolution kernels, and may be used interchangeably with the convolution kernels unless otherwise stated) which are partially overlapped with each other. In addition, in the context of the present disclosure, unless otherwise explicitly stated, one of any two layers in the CNN 1 which is closer to input data (or an input layer such as an input layer 10 of FIG. 1) is referred to as a "preceding" or "lower" layer, while the other one of the any two layers which is closer to output data (or an output layer, such as an output layer 70 of FIG. 1) is referred to as a "subsequent" or "upper" layer. In addition, a direction from the input layer (for example, the input layer 10 of FIG. 1) to the output layer (for example, the output layer 70 of FIG. 1) during training, verification and/or use is referred to as a forward direction while a direction from the output layer (for example, the output layer 70 of FIG. 1) to the input layer (for example, the input layer 10 of FIG. 1) is referred to as a backward direction.

By taking the first convolutional layer 20 shown in FIG. 1 as an example, these small neurons may process various parts of an input image (for example, a part of the input layer 10 located in Einstein's eyes). Outputs of these small neurons are then combined and arranged as one output (which is referred to as a feature map, such as each rectangle in the first convolutional layer 20) to obtain an output image which better represents some of features in the original image. At the same time, adjacent neurons are arranged to be partially overlapped, so that the CNN 1 has some translational tolerance to the features in the original image. In other words, the CNN 1 can recognize the features in the original image correctly even if positions of the features change in a translational manner within a certain tolerance. A detailed description of the convolutional layer will be given later and will not be discussed in detail here.

A next layer 30 is an optional pooling layer, i.e., a first pooling layer 30, which is primarily used to down-sample output data of the preceding convolutional layer 20 in a case that the features are maintained, thereby reducing computational complexity and preventing over-fitting. A detailed description of the pooling layer will be given later and will not be discussed in detail here.

A next layer 40 is also a convolutional layer, which may further sample features of output data which is generated by the first convolutional layer 20 and is down-sampled by the pooling layer 30. Intuitively, the features learned by the next layer 40 are globally larger than those learned by the first convolutional layer. Likewise, each of subsequent convolutional layers is used to globalize features of a preceding convolutional layer.

As an intuitive example, it may be considered that the features learned by the first convolutional layer 20 may be subtle (or very localized) features such as a color and a contour of eyes, eyelashes, a contour and a shadow of a nose, a contour and a color of a mouth etc., and the features learned by the second convolutional layer 40 for the output of the first convolutional layer 20 may be features of slightly larger facial organs such as eyes (which are recognized according to, for example, a color and a contour of the eyes, eyelashes etc.), a nose (which is determined according to a contour and a shadow of the nose etc.), a mouth (which is determined according to, for example, a contour and a color of the mouth etc.) etc., which are globally larger than those learned by the first convolutional layer 20. A possible third convolutional layer not shown in FIG. 1 or a fully connected layer 60 shown in FIG. 1 may learn more global features such as a human face (which is determined according to, for example, eyes, a nose, a mouth, etc.) according to an output of the second convolutional layer 40, and finally determine that there is a human face in the image or determine positions of feature points of the human face in the image. Of course, the present disclosure is not limited thereto. In addition, a detailed description of the fully connected layer will be given later and will not be discussed in detail here.

However, while the above examples are given in a way which can be understood by human beings, features learned by a CNN in fact are usually not semantic features which can be understood by human beings, and instead are abstract features which usually cannot be understood by human beings at all. However, the computer may determine that there is a human face and determine various parts of the human face by combining these features together. For the sake of understanding, it may be considered that a standard for a person to determine whether there is a human face may be to view whether there are human eyes, nose, mouth etc. in an image, a standard for another person to determine whether there is a human face may be to view whether there are eyebrows, a chin etc. in the image, and a standard for some strange persons to determine whether there is a human face may be to view whether there are glasses, a mask, earrings etc. in the image. The CNN may be the strangest "person," and may use a series of features which cannot be described by human language at all to determine whether there is a human face and determine various parts of the human face, for example, a combination of some particular pixels.

The CNN can significantly solve or mitigate problems with other Multi-Layer Perceptron (MLP) neural network architecture by using strong spatial local correlation which is widespread in natural images. Compared with the MLP architecture, the CNN has at least the following features:

3-dimensional neurons. As shown in FIG. 1, each of the convolutional layers 20 and 40 of the CNN 1 has neurons which are arranged in a three-dimensional manner of width (abbreviated as w), height (abbreviated as h), and depth (abbreviated as d). In an example shown in FIG. 1, two dimensions (i.e., w and h) of each rectangle in the convolutional layers 20 and 40 represent a width and a height of a feature map which is obtained by perform mapping using convolution kernels of this layer, and a number of rectangles represents a depth of the layer. In a case of convolution kernels which share weights mentioned later, a number of rectangles also represents a number of the convolution kernels. In a case of convolution kernels which do not share weights mentioned later, a number of the convolution kernels is jointly determined by three dimensions of the convolutional layer. For example, in a case that weights are shared, the convolutional layer 20 shown in FIG. 1 comprises 4 rectangles, that is, there are 4 convolution kernels in this layer, or more exactly, all convolution kernels in the same rectangle have the same weights, so that an input image is mapped into one feature map by each convolution kernel. For example, in a case that weights are not shared, the convolutional layer 20 shown in FIG. 1 comprises four rectangles, and each point of each rectangle corresponds to one convolution kernel. Therefore, a number of convolution kernels is l×w×h, and an input image is mapped into one feature map by w×h convolution kernels in the same rectangle. In addition, as shown in FIG. 1, the neurons in one layer are connected to only a small region (i.e., a receptive field) of a preceding layer. Different types of layers (locally connected layers and fully connected layers) are stacked together to form CNN architecture.

Local connectivity. Based on a concept of the receptive field, the CNN 1 may take advantages of the spatial local correlation by enforcement of a local connection mode between neurons in adjacent layers. Thus, this architecture ensures that the learned "convolution kernel" produces the strongest response to a spatial local input pattern. Many of these layers are stacked to obtain a non-linear "convolution kernel" which becomes gradually "globalized" (i.e., responding to a larger region in a pixel space). This allows the network to firstly create good representations of small parts of an input and then combine the representations of these small parts into a representation of a larger region, as explained earlier in the example for "nose/eyes/mouth."

Shared weights. In the CNN 1, various convolution kernels may be repeated over the entire field of view (i.e., in wide and height planes). These repeated units may share the same parameters (weight vectors and offsets) and form a feature map. This means that all neurons in a given convolutional layer may detect the same features. Units which are repeated in this way allow detection of features regardless of where the features appear in the field of view, thereby producing translation invariant characteristics. Weight sharing also helps to significantly reduce a number of free parameters to be learned, thereby reducing an amount of memory required for operation of the network. Reduction in memory usage allows training a larger and more powerful network. In addition, as described in detail below, in the CNN 1, the weights may not be shared, so as to achieve the technical effect in the embodiments of the present disclosure.

Next, various basic constitutional units which may be included in the CNN 1 will be described in detail.

As shown in FIG. 1, the CNN 1 may be formed by stacking different layers 20-60, which may convert input data into output data. Several different types of layers are described below.

Convolutional Layer

Convolutional layers (for example, first and second convolutional layers 20 and 40) are core constitutional units of a CNN (for example, the CNN 1). Parameters of such layers consist of a set of learnable convolution kernels (or convolution kernels for short), each of which has a small receptive field but extends along the entire depth of input data (for example, as shown by reference numerals 25, 35 and 45 in FIG. 1). In a forward process, each convolution kernel is convoluted along a width and a height of the input data, a dot product between elements of the convolution kernel and the input data is calculated, and a two-dimensional activation map of the convolution kernel is generated. As a result, a network can learn convolution kernels which can be activated when a particular type of feature is viewed at a spatial position of the input.

Activation maps of all convolution kernels are stacked in the depth direction, to form full output data of the convolutional layer. Therefore, each element in the output data may be interpreted as output of a convolution kernel which views a small region in the input and shares parameters with other convolution kernels in the same activation map.

As described above, when a large-size input such as an image etc. is processed, it is impractical to connect a convolution kernel in a current layer to all the convolution kernels in a preceding layer, since this network architecture does not take a spatial structure of data into account. The convolutional network takes advantages of spatial local correlation by enforcement of a local connection mode between convolution kernels of adjacent layers, that is, each convolution kernel is only connected to a small region of input data. A degree of connectivity is referred to as a parameter of a receptive field of the convolution kernel. The connection is local (along the width and height) in space, but always extends along the entire depth of the input data. This architecture ensures that the learned convolution kernels produce the strongest response to the spatial local input pattern.

As described above, multiple parameters such as a depth, a step, and zero padding, may also control a size of output data of the convolutional layer, in addition to a size of the input data (for example, the width and the height of the image in a case of two dimensions).

The depth of the output data controls a number of convolution kernels in the layer which are connected to the same region of the input data. For example, as shown in FIG. 1, the first convolutional layer 20 has a depth of 4 and the second convolutional layer 40 has a depth of 12. All of these convolution kernels will learn to be activated for different features in the input. For example, if the first convolutional layer 20 uses an original image as an input, different convolution kernels (i.e., different rectangles in FIG. 1) in the depth dimension may be activated when various directional sides or color blocks appear in the input data.

The step controls how depth columns for spatial dimensions (width and height) are allocated. For example, in FIG. 1, when the step is 1, input data of two adjacent convolution kernels in each rectangle in the first convolutional layer 20 differ by only 1 spatial unit. This results in high overlapping between receptive fields of various columns and results in output data with a larger size. Conversely, if a higher step is used, the receptive fields are not overlapped to a large extent and the resulting output data may have a smaller spatial size.

In addition, in order to facilitate a convolution operation at an edge of an image, it is sometimes convenient to fill in the input data with 0s at the edge of the input data, or in some other embodiments, zero padding may be substituted by populating with data on the opposite side, or in still some other embodiments, there is simply no zero padding, which makes the input data have a size which is slightly larger than that of the output data. A size of the zero padding is a third parameter. The zero padding provides control over a spatial size of the output data. Specifically, it is sometimes necessary to strictly maintain a spatial size of the input data, so that the zero padding must be used to maintain the spatial size.

As described above, parameter sharing solutions are used in the convolutional layer to control a number of free parameters. It relies on a reasonable assumption that if a feature is useful for calculation at a certain spatial position, it should also be useful for calculation at a different position. More generally, if a feature may appear at a position on the image, it should also possibly appear anywhere else. In other words, if a single two-dimensional slice at a depth is defined as a depth slice (i.e., there are only a width and a height, such as each rectangle shown in FIG. 1), convolution kernels in each depth slice are constrained to use the same weights and offsets.

As all convolution kernels in a single depth slice may share the same parameters, a forward process for each depth slice in the convolutional layer may be calculated as a convolution of the weights of the convolution kernels with the input data (which is then optionally added with the offsets). For example, assuming that the input data and the convolution kernels which share the weights are 4×4 and 2×2 matrices respectively as follows, a result of the convolution operation with a step of 1 without zero padding and offsets is as shown in the following equation (1):

$$\begin{bmatrix} 1 & 1 & 1 & 0 \\ 0 & 1 & 1 & 1 \\ 0 & 0 & 1 & 1 \\ 0 & 1 & 1 & 0 \end{bmatrix} \otimes \begin{bmatrix} 1 & 0 \\ 0 & 1 \end{bmatrix} = \begin{bmatrix} 2 & 2 & 2 \\ 0 & 2 & 2 \\ 1 & 1 & 1 \end{bmatrix} \quad (1)$$

where $\otimes$ is a convolution operator.

It should be noted that sometimes the assumptions of parameter sharing are not necessarily required. This is especially true when the input image of the CNN has specific structured features, wherein it is desired to learn completely different features at different spatial positions. In a scene such as facial feature recognition, it may be expected that different facial features such as eyes, hair, eyebrows, a nose, a mouth, ears, etc., should be learned at different positions. In this case, parameter sharing may not be required, and instead the layer is referred to as a locally connected layer or a locally connected convolutional layer. In these layers, various convolution kernels in the same depth slice do not share parameters, and such a non-shared convolutional layer consumes more memory, more training time, etc. than a shared convolutional layer which is configured similarly. However, as described above, it would be more preferable to use such non-shared convolutional layers as preceding layers in the CNN when there is a strong structured configuration (for example, a human face) in the image.

For example, for each 2×2 local or receptive field of 4×4 input data in equation (1), multiple (up to 9 in this example) convolution kernels which do not share weights may be used to perform a convolution operation, which also results in 3×3 output data. However, as different convolution kernels are used, each element in the output data is usually different from a corresponding element in the output data in equation (1). However, in some special cases, depending on a training process of convolution kernels which do not share weights, all or a part of the convolution kernels which do not share weights may be the same, so that the output data may be completely or partly the same as the output data in equation (1).

Pooling Layer

Another important concept in the CNN is pooling, which has a non-linear down-sampled form. There are several non-linear functions which are used to implement pooling, including at least maximum pooling and average pooling which are commonly used. The maximum pooling divides an input image into a set of non-overlapped rectangles, and outputs a maximum value for each of such sub-regions. For example, if an input of a pooling layer is a 4×4 two-dimensional array (or matrix) as shown in Table 1 on the left below, an output of the maximum pooling layer may be a 2×2 two-dimensional array (or matrix) as shown in Table 2 on the right below:

TABLE 1

| 1 | 0 | 2 | 3 |
|---|---|---|---|
| 4 | 6 | 6 | 8 |
| 3 | 1 | 1 | 0 |
| 1 | 2 | 2 | 4 |

TABLE 2

| 6 | 8 |
|---|---|
| 3 | 4 |

Intuitively, this means that once a feature is found, its exact position is less important than its approximate positions relative to other features. A function of the pooling layer is to gradually reduce a spatial size of data, so as to reduce a number of parameters and computational complexity in the network and thus also prevent over-fitting. Pooling layers may be inserted periodically or in other modes between contiguous convolutional layers in the CNN architecture. For example, in the example shown in FIG. 1, pooling layers 30 and 50 are provided after the convolutional layers 20 and 40, respectively. A pooling operation provides a degree of translational invariance.

The pooling layer operates independently for each depth slice of input data and spatially adjusts its size. The most common form is a pooling layer of a convolution kernel with a size of 2×2, which is applied in width and height with 2 down-samples of each depth slice in the input as a step, thereby giving up 75% activation. Each of a maximum (MAX) operation or an average (AVG) operation takes a maximum value of four numbers or an average value of the four numbers. In addition, a size in the depth direction does not change. In addition, other pooling functions such as L2 norm pooling etc. may also be used. In addition, the pooling layer is not necessary, but is optional.

ReLU Layer (More Generally, an Activation Layer (Sometimes Also Referred to as an Excitation Layer))

ReLU is an abbreviation for a Rectified Linear Unit. This is a neuron layer to which an unsaturated activation function $f(x)=\max(0,x)$ applies. It increases non-linearity of a decision function and the entire network without affecting the receptive field of the convolutional layer.

Of course, in some other embodiments, other functions, such as a hyperbolic tangent function $f(x)=\tanh(x)$ and a Sigmoid function $f(x)-(1+e^{-x})^{-1}$, may also be used to increase the non-linearity. A ReLU function is more commonly used than other functions since it makes a training speed of the neural network be several times faster without having a significant impact on accuracy.

Although the ReLU layer (or the activation layer) is not explicitly shown in FIG. 1, in some embodiments, each convolutional layer may be followed by one ReLU layer, so that the non-linearity of the output of each convolutional layer increases, and a premature saturation state in a training phase is prevented.

Fully Connected Layer

Finally, global features in the neural network may be captured via the fully connected layer after the convolutional layer, the pooling layer and/or the activation layer. As shown in FIG. 1, a last layer 60 is a fully connected layer 60. A convolution kernel in the fully connected layer 60 has a full connection for all activations in a preceding layer, which is the same as in a conventional neural network. Therefore, its activation may be calculated using matrix multiplication and then using offsets.

In addition, an output 70 of the fully connected layer 60 may be a one-dimensional array in which each element represents a likelihood index that the image is classified into a certain category. In a context of facial feature recognition, the output may be used, for example, to determine whether there is a human face in the image, determine whether there are facial organs (for example, eyes, a nose, a mouth, eyebrows, a chin, hair, a tongue or even eyelashes, etc.) in the image, and determine positions of these organs (if any) etc.

In addition, as a size of a feature map decreases with a depth of the CNN 1, layers (preceding layers) which are closer to the input layer may tend to have fewer convolution kernels, and layers (subsequent layers) which are closer to the output layer may have more convolution kernels. In order to balance x computational complexity of various layers, a product of a number of feature maps and a number of pixel positions is usually set to be approximately constant in various layers. If input-related information is to be retained, it is required that a total number of activations (a number of feature maps multiplied by the number of pixel positions) may be reduced layer by layer. However, it should be noted that this is not necessary. In other embodiments, different settings may also be used. A number of feature maps directly controls the capacity and depends on a number of available samples and complexity of a task.

Shape of a Convolution Kernel

Shapes of receptive fields commonly used in various literatures are ever-changing and are often selected based on a data set. A best result for an image with a size of 28×28 of the Mixed National Institute of Standards and Technology (MNIST) database is typically 5×5 on a first layer, while a data set of a natural image (typically with hundreds of pixels in each dimension) tends to use a larger shape, which is 12×12 or 15×15, for a first layer of convolution kernels. Therefore, the difficulty is to find a correct level of granularity in a case of a particular data set to produce abstraction on a correct scale.

In an exemplary embodiment of the present disclosure, a configuration of convolution kernels of respective convolutional layers as shown in Table 3 below may be used.

TABLE 3

Exemplary setting of a convolutional layer of a CNN

| Layer number | Layer type | Number of convolution kernels | Size of convolution kernels |
|---|---|---|---|
| 1 | Non-shared convolutional layer | 20 | 4 × 4 |
| 2 | Non-shared convolutional layer | 40 | 3 × 3 |
| 3 | Non-shared convolutional layer | 60 | 3 × 3 |
| 4 | Non-shared convolutional layer | 80 | 2 × 2 |
| 5 | Shared convolutional layer | 80 | 3 × 3 |
| 6 | Shared convolutional layer | 80 | 3 × 3 |
| 7 | Shared convolutional layer | 80 | 3 × 3 |
| 8 | Shared convolutional layer | 80 | 2 × 2 |
| 9 | Shared convolutional layer | 80 | 2 × 2 |
| 10 | Fully connected layer | 100 | |

However, the embodiments of the present disclosure are not limited thereto. For example, in some embodiments, a size of convolution kernels of a preceding non-shared convolutional layer may be greater than or equal to that of convolution kernels of a subsequent non-shared convolutional layer in the CNN. In addition, in some embodiments, a number of the convolution kernels of the preceding non-shared convolutional layer may be less than or equal to that of the convolution kernels of the subsequent non-shared convolutional layer in the CNN. In addition, in some embodiments, a number of the non-shared convolutional layers may be from 3 to 5. In addition, in some embodiments, a number of shared convolutional layers may be from 3 to 7. However, the present disclosure is also not limited to the embodiments described above.

In addition, although not shown in Table 1, an activation layer and/or a pooling layer may also be provided after each convolutional layer.

Shape of Maximum Pooling

A size of a receptive field in a pooling layer is generally 2×2. 4×4 pooling may be used for very large input data in each layer (a preceding layer) which is closer to the input layer. However, if a larger shape is selected, it may drastically reduce magnitude of a signal and may result in discarding too much information in output data of a preceding layer. Therefore, 2×2 may generally be selected as the size of the receptive field of the pooling layer.

In the embodiment shown in Table 1, for example, local features of different parts are firstly learned by using a plurality of non-shared convolutional layers and then global features are extended from the local features using subsequent multiple convolutional layers having small-size convolution kernels. At the same time, as described above, the convolution kernels which share weights can effectively reduce computational complexity and save resources of the memory and the processor. In addition, each convolutional layer may be followed by and connected to a maximum pooling layer and an activation layer, wherein a hyperbolic tangent function and/or a ReLU function may be used for the activation layer. The activation layer enables a relationship between the output and the input to maintain a monotonously rising or falling relationship which is non-linear, which lags a saturation period compared with the Sigmoid function and has good fault tolerance to the neural network. In addition, a fully connected layer may be used as the last layer.

So far, a method of combining local layers having convolution kernels which do not share weights and layers having convolution kernels which share weights has been proposed with reference to FIG. 1 to implement more robust extraction of key points. The solution effectively utilizes structured information of a human face while taking image results of the human face in different environments into account, thereby realizing rapid and accurate recognition of facial features.

CNN Training Process

The training process is a very important part of deep learning. In order to ensure that the network can effectively converge, a stochastic gradient descent method may be used. For example, a Nesterov optimization algorithm may be used for obtaining a solution. In some embodiments, an initial learning rate may be set to start from $10^{-2}$ and gradually decrease until an optimal value is found. In addition, in some embodiments, for initial values of weights, a Gaussian random process with a small variance may be used to initialize weights for each convolution kernel.

In some embodiments, an image training set may use a Labeled Face in the Wild (LFW) database (with 5,000 faces) and data of human faces (with 3,000 human faces) on the network, each of which is marked with facial key points, wherein 5,000 human faces may be used for training and the remaining 3,000 human faces may be used for verification.

Figure 2:
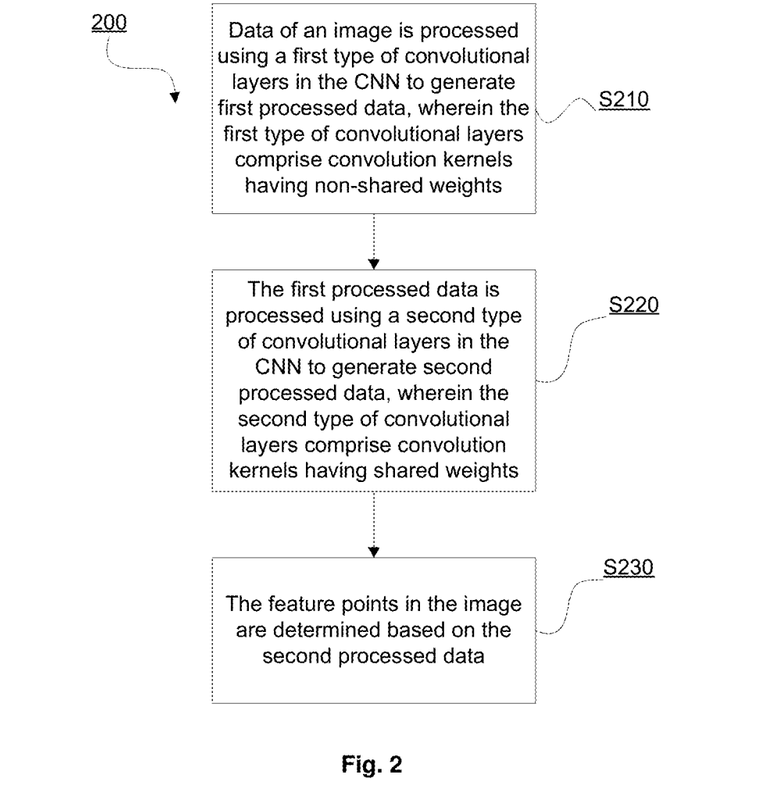
FIG. 2 is a flowchart illustrating an exemplary method performed at a device for detecting feature points in an image using a convolutional neural network according to an embodiment of the present disclosure.

FIG. 2 is a flowchart illustrating a method 200 performed in a device (for example, the device 100 in FIG. 3 and/or the device 400 shown in FIG. 4) for detecting features in an image using a CNN according to an embodiment of the present disclosure. As shown in FIG. 2, the method 200 may comprise steps S210, S220 and S230. According to the present disclosure, some steps of the method 200 may be performed separately or in combination, may be performed in parallel or sequentially, and are not limited to the specific operation sequence shown in FIG. 2.

Figure 3:
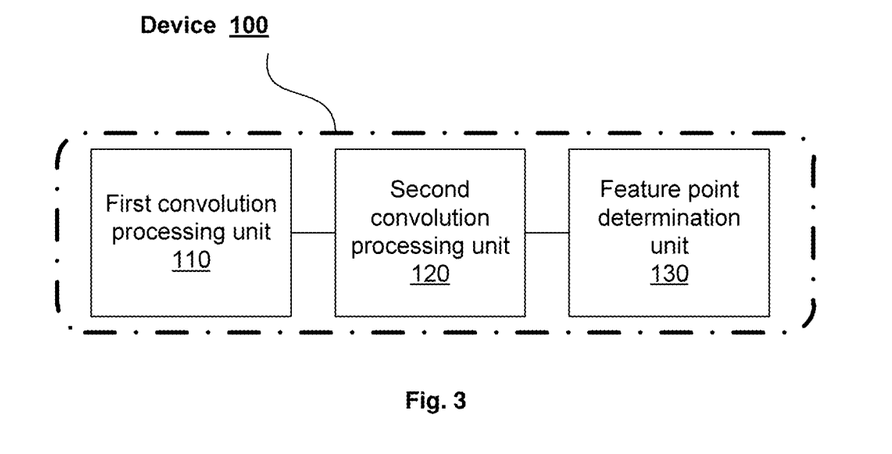
FIG. 3 is a block diagram illustrating an exemplary device for executing the method shown in FIG. 2 according to an embodiment of the present disclosure.

FIG. 3 is a block diagram illustrating an exemplary device 100 for detecting features in an image using a CNN according to an embodiment of the disclosure. As shown in FIG. 3, the device 100 may comprise a first convolution processing unit 110, a second convolution processing unit 120, and a feature point determination unit 130.

The first convolution processing unit 110 may process data of the image using a first type of convolutional layers in the CNN (for example, the CNN shown in Table 1) to generate first processed data, wherein the first type of convolutional layers comprise convolution kernels having non-shared weights. The first convolution processing unit 110 may be a Central Processing Unit (CPU), a Digital Signal Processor (DSP), a microprocessor, a microcontroller, etc. of the device 100 which may cooperate with a communication part (for example, a wireless transceiver, an Ethernet card, an xDSL modem etc.) and/or a storage part (for example, a Random Access Memory (RAM), a Secure Digital (SD) card etc.) of the device 100 to receive the data of the image to be processed and use the convolutional layers which do not share weights in the CNN (for example the CNN shown in Table 1) to process the data of the image to generate the first processed data.

The second convolution processing unit 120 may process the first processed data using a second type of convolutional layers in the CNN (for example, the CNN shown in Table 1) to generate second processed data, wherein the second type of convolutional layers comprise convolution kernels having shared weights. The second convolution processing unit 120 may also be a CPU, a DSP, a microprocessor, a microcontroller, etc. of the device 100, which may acquire the data (i.e., the first processed data) of the image which has been processed by the first convolution processing unit 110 and process the first processed data using the convolutional layers which share weights in the CNN (for example, the CNN shown in Table 1) to generate second processed data.

The feature point determination unit 130 may determine the feature points in the image based on the second processed data. The feature point determination unit 130 may also be a CPU, a DSP, a microprocessor, a microcontroller, etc. of the device 100, which may acquire the data (i.e., second processed data) of the image which has been processed by the second convolution processing unit 120, and determine the feature points in the image based on the second processed data. For example, a comprehensive determination can be made by a fully connected layer according to various local features which have been processed by various preceding layers.

In addition, the device 100 may further comprise other functional units not shown in FIG. 3, such as a bus, a memory, a power supply, an antenna, a communication part, and a storage part. However, they do not affect the understanding of the principles of the present application, and thus their detailed descriptions are omitted herein.

The method 200 performed on the device 100 for detecting feature points in an image using a convolutional neural network according to an embodiment of the present disclosure and the device 100 will be described in detail below with reference to FIG. 2 and FIG. 3.

The method 200 begins at step S210 in which data of an image may be processed by a first convolution processing unit 110 of the device 100 using a first type of convolutional layers in the CNN to generate first processed data, wherein the first type of convolutional layers comprise convolution kernels having non-shared weights.

In step S220, the first processed data may be processed by the second convolution processing unit 120 of the device 100 using a second type of convolutional layers in the CNN to generate second processed data, wherein the second type of convolutional layers comprise convolution kernels having shared weights.

In step S230, the feature points in the image may be determined by the feature point determination unit 130 of the device 100 based on the second processed data.

In some embodiments, a size of convolution kernels of a preceding one of the first type of convolutional layers may be greater than or equal to that of convolution kernels of a subsequent one of the first type of convolutional layers in the CNN, and a number of the convolution kernels of the preceding one of the first type of convolutional layers may be less than or equal to that of the convolution kernels of the subsequent one of the first type of convolutional layers in the CNN. In some embodiments, a number of the first type of convolutional layers may be from 3 to 5. In some embodiments, a number of the second type of convolutional layers may be from 3 to 7. In some embodiments, the first type of convolutional layers may be located in front of the second type of convolutional layers in the CNN. In some embodiments, the first type of convolutional layers of the CNN may comprise 4 convolutional layers, which may comprise 20 4×4 convolution kernels, 40 3×3 convolution kernels, 60 3×3 convolution kernels and 80 2×2 convolution kernels respectively. In some embodiments, the second type of convolutional layers of the CNN may comprise 5 convolutional layers, which may comprise 80 3×3 convolution kernels, 80 3×3 convolution kernels, 80 3×3 convolution kernels, 80 2×2 convolution kernels, and 80 2×2 convolution kernels respectively. In some embodiments, a feature point determination unit may further be configured to: process the second processed data using a third type of convolutional layers in the CNN to generate third processed data, wherein the third type of convolutional layers may be fully connected convolutional layers; and determine the feature points in the image based on the third processed data. In some embodiments, the CNN may further comprise an activation layer which is immediately after each of the first type of convolutional layers and/or each of the second type of convolutional layers, wherein the activation layer may use one of the following activation functions: a Sigmoid function, a hyperbolic tangent function and/or a Rectified Linear Unit (ReLU) function. In some embodiments, the CNN may further comprise a pooling layer which is immediately after each of the first type of convolutional layers and/or each of the second type of convolutional layers, wherein the pooling layer may use one of the following pooling functions: a maximum pooling function and/or an average pooling function. In some embodiments, the CNN may be trained using a Stochastic Gradient Descent (SGD) method. In some embodiments, an initial learning rate may be $10^{-2}$. In some embodiments, initial weights of each of the convolutional layers in the CNN may be initialized using Gaussian random numbers with a mean of 0 and a variance of 0.01.

Figure 4:
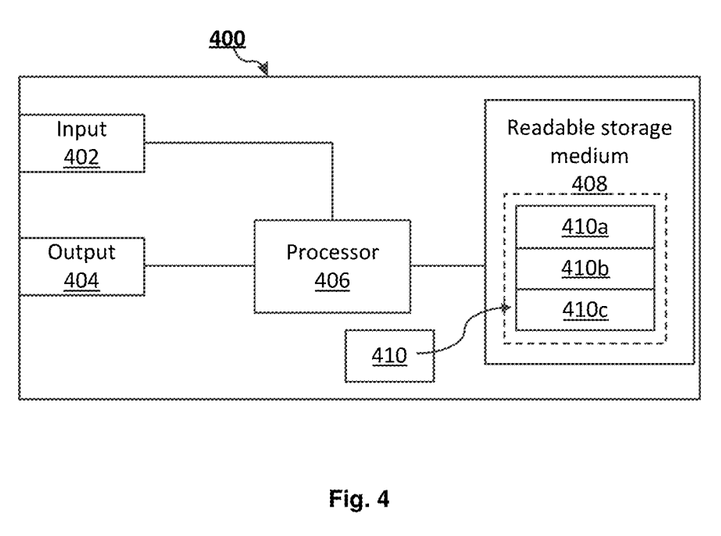
FIG. 4 is a block diagram illustrating an exemplary hardware arrangement of the device shown in FIG. 3 according to an embodiment of the present disclosure.

FIG. 4 is a block diagram illustrating an exemplary hardware arrangement 400 of the device 100 shown in FIG. 3 according to an embodiment of the present disclosure. The hardware arrangement 400 comprises a processor 406 (for example, a DSP). The processor 406 may be a single processing unit or a plurality of processing units for performing different actions of the flow described herein. The arrangement 400 may also comprise an input unit 402 for receiving signals from other entities, and an output unit 404 for providing signals to other entities. The input unit 402 and the output unit 404 may be arranged as a single entity or separate entities.

In addition, the arrangement 400 may comprise at least one readable storage medium 408 in a form of non-volatile or volatile memory, such as an Electrically Erasable Programmable Read-Only Memory (EEPROM), a flash memory, and/or a hard disk driver. The readable storage medium 408 comprises a computer program 410 which includes codes/computer readable instructions that, when executed by the processor 406 in the arrangement 400, cause the hardware arrangement 400 and/or the device 100 including the hardware arrangement 400 to perform, for example, flows described above in connection with FIGS. 1-3 and any variation thereof.

The computer program 410 may be configured with computer program codes having, for example, architecture of computer program modules 410A-410C. Therefore, in an exemplary embodiment when the hardware arrangement 400 is used in the device 100, the codes in the computer program of the arrangement 400 may comprise a module 410A for processing data of the image using a first type of convolutional layers in a CNN to generate first processed data, wherein the first type of convolutional layers comprise convolution kernels having non-shared weights. The codes in the computer program also comprise a module 410B for processing the first processed data using a second type of convolutional layers in the CNN to generate second processed data, wherein the second type of convolutional layers comprise convolution kernels having shared weights. The codes in the computer program also comprise a module 410C for determining the feature points in the image based on the second processed data.

The computer program modules may substantially perform the various actions in the flow shown in FIGS. 1-3 to simulate the device 100. In other words, when different computer program modules are executed in the processor 406, they may correspond to the above different units in the device 100.

Although the code means in the embodiments disclosed above in conjunction with FIG. 4 are implemented as computer program modules that, when executed in the processor 206, cause the hardware arrangement 400 to perform the actions described above in connection with FIGS. 1-3, in alternative embodiments, at least one of the code means may be implemented at least in part as a hardware circuit.

The processor may be a single CPU, but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a RAM, a Read Only Memory (ROM), and an EEPROM, and the computer program module may, in an alternative embodiment, be distributed to different computer program products in a form of memory within the UE.

The present disclosure has thus far been described in connection with preferred embodiments. It is to be understood that various other changes, substitutions and additions can be made by those skilled in the art without departing from the spirit and scope of the present disclosure. For example, different technical features in different embodiments can be combined to form a new embodiment. Accordingly, the scope of the present disclosure is not limited to the specific embodiments described above, but should be defined by the appended claims.

In addition, functions described herein as being implemented by only hardware, only software and/or firmware can also be implemented by means of dedicated hardware, a combination of general purpose hardware and software, etc. For example, functions described as being implemented by dedicated hardware (for example, a Field Programmable Gate Array (FPGA), an ASIC, etc.) can be implemented by general purpose hardware (for example, a CPU, a DSP) in combination with software, and vice versa.

We claim:

1. A method for detecting feature points in an image, comprising:
    processing data of the image using a first type of convolutional layers in a Convolutional Neural Network (CNN) to generate first processed data, wherein the first type of convolutional layers comprise a plurality of first convolution kernels having non-shared weights;
    processing the first processed data using a second type of convolutional layers in the CNN to generate second processed data, wherein the second type of convolutional layers comprise a plurality of second convolution kernels having shared weights; and
    determining the feature points in the image based on the second processed data;
    wherein the plurality of first convolution kernels do not share weights for respective receptive fields data inputted to the plurality of first convolution kernels; and the plurality of second convolution kernels share weights for respective receptive fields data inputted to the plurality of second convolution kernels.

2. The method according to claim 1, wherein a size of convolution kernels of a preceding one of the first type of convolutional layers is greater than or equal to that of convolution kernels of a subsequent one of the first type of convolutional layers in the CNN, and a number of the convolution kernels of the preceding one of the first type of convolutional layers is less than or equal to that of the convolution kernels of the subsequent one of the first type of convolutional layers in the CNN.

3. The method according to claim 1, wherein a number of the first type of convolutional layers is from 3 to 5.

4. The method according to claim 3, wherein the first type of convolutional layers of the CNN comprise 4 convolutional layers, which comprise 20 4×4 convolution kernels, 40 3×3 convolution kernels, 60 3×3 convolution kernels and 80 2×2 convolution kernels, respectively.

5. The method according to claim 1, wherein a number of the second type of convolutional layers is from 3 to 7.

6. The method according to claim 5, wherein the second type of convolutional layers of the CNN comprise 5 convolutional layers, which comprise 80 3×3 convolution kernels, 80 3×3 convolution kernels, 80 3×3 convolution kernels, 80 2×2 convolution kernels, and 80 2×2 convolution kernels, respectively.

7. The method according to claim 1, wherein the first type of convolutional layers precede the second type of convolutional layers in the CNN.

8. The method according to claim 1, wherein the step of determining the feature points in the image based on the second processed data further comprises:
    processing the second processed data using a third type of convolutional layers in the CNN to generate third processed data, wherein the third type of convolutional layers are fully connected convolutional layers; and
    determining the feature points in the image based on the third processed data.

9. The method according to claim 1, wherein the CNN further comprises an activation layer which is immediately after each of the first type of convolutional layers and/or each of the second type of convolutional layers, wherein
    the activation layer uses one of the following activation functions: a Sigmoid function, a hyperbolic tangent function, and a Rectified Linear Unit (ReLU) function.

10. The method according to claim 1, wherein the CNN further comprises a pooling layer which is immediately after each of the first type of convolutional layers and/or each of the second type of convolutional layers, wherein
the pooling layer uses one of the following pooling functions: a maximum pooling function, and an average pooling function.

11. The method according to claim 1, wherein the CNN is trained using a Stochastic Gradient Descent (SGD) method.

12. The method according to claim 11, wherein an initial learning rate is $10^{-2}$.

13. The method according to claim 11, wherein initial weights of each of the convolutional layers in the CNN are initialized using Gaussian random numbers with a mean of 0 and a variance of 0.01.

14. A device for detecting feature points in an image, comprising:
a processor; and
a memory having instructions stored thereon, wherein the instructions when executed by the processor, cause the processor to to process data of the image using a first type of convolutional layers in a Convolutional Neural Network (CNN) to generate first processed data, wherein the first type of convolutional layers comprise a plurality of convolution kernels having non-shared weights, wherein the plurality of first convolution kernels do not share weights for the respective receptive fields data inputted to the plurality of first convolution kernels;
process the first processed data using a second type of convolutional layers in the CNN to generate second processed data, wherein the second type of convolutional layers comprise a plurality of second convolution kernels having shared weights, and wherein the plurality of second convolution kernels share weights for respective receptive fields data inputted to the plurality of second convolution kernels; and
determine the feature points in the image based on the second processed data.

15. The device according to claim 14, wherein a size of convolution kernels of a preceding one of the first type of convolutional layers is greater than or equal to that of convolution kernels of a subsequent one of the first type of convolutional layers in the CNN, and a number of the convolution kernels of the preceding one of the first type of convolutional layers is less than or equal to that of the convolution kernels of the subsequent one of the first type of convolutional layers in the CNN; and
the first type of convolutional layers precede the second type of convolutional layers in the CNN.

16. The device according to claim 14, wherein the instructions when executed by the processor, further cause the processor to:
process the second processed data using a third type of convolutional layers in the CNN to generate third processed data, wherein the third type of convolutional layers are fully connected convolutional layers; and
determine the feature points in the image based on the third processed data.

17. The device according to claim 14, wherein the CNN further comprises an activation layer which is immediately after each of the first type of convolutional layers and/or each of the second type of convolutional layers, wherein
the activation layer uses one of the following activation functions: a Sigmoid function, a hyperbolic tangent function, and a Rectified Linear Unit (ReLU) function.

18. The device according to claim 14, wherein the CNN further comprises a pooling layer which is immediately after each of the first type of convolutional layers and/or each of the second type of convolutional layers, wherein
the pooling layer uses one of the following pooling functions: a maximum pooling function, and an average pooling function.

19. A non-transitory computer readable storage medium having instructions stored thereon, wherein the instructions, when executed by a computer, cause the computer to perform the method according to claim 1.

* * * * *